United States Patent [19]

Imazeki

[11] 4,032,844
[45] June 28, 1977

[54] COMBINATION MICROPHONE, SPEAKER, AND CONTROL UNIT FOR A RADIO TRANSCEIVER

[75] Inventor: Kazuyoshi Imazeki, Tokyo, Japan

[73] Assignee: General Research of Electronics, Inc., Tokyo, Japan

[22] Filed: Dec. 22, 1975

[21] Appl. No.: 643,485

[30] Foreign Application Priority Data

Dec. 28, 1974  Japan .......................... 50-4318[U]

[52] U.S. Cl. ................................. 325/15; 325/25; 325/183; 325/391; 179/179

[51] Int. Cl.² ........................................ H01B 1/38

[58] Field of Search ................ 325/15, 16, 25, 183, 325/390, 391; 179/179

[56] References Cited

UNITED STATES PATENTS

| | | | |
|---|---|---|---|
| 2,199,371 | 4/1940 | Goldsmith | 325/390 |
| 3,306,990 | 2/1967 | Walker | 325/16 |
| 3,969,673 | 7/1976 | Nordlof | 325/16 |

OTHER PUBLICATIONS

Series 4500 UHF–FM Two Way Radio, RF Communications Div. Jan. 29, 1974.
1502 MX Hand Held, Wilson Electronics, Communications, Oct. 1975.

*Primary Examiner*—Robert L. Griffin
*Assistant Examiner*—Tommy P. Chin
*Attorney, Agent, or Firm*—Olson, Trexler, Wolters, Bushnell & Fosse, Ltd.

[57] ABSTRACT

A combination microphone, loudspeaker, and control unit is disclosed which is adapted to be coupled by a multiconductor cable to a radio transceiver which is capable of transmitting and receiving a plurality of radio signals at preselected frequencies. A multi-conductor cable is secured to a housing for the unit and is adapted to electrically connect the unit to a radio transceiver. A multi-position switch is mounted in the housing and connected to the cable, with the switch being operable to select individually the preselected frequencies. An electromechanical transducer is mounted in the housing and connected to the cable and operable to convert audible sound wave signals into corresponding audio frequency electrical signals and audio frequency electrical signals into corresponding audible sound wave signals. A transmit/receive switch is mounted on the housing and coupled to the cable and the transducer for selectively enabling the transducer to convert audible sound wave signals into corresponding audio frequency electrical signals and audio frequency electrical signals into corresponding audible sound wave signals. A volume control is mounted on the housing and coupled to the cable and the transducer for varying the amplitude of the audio frequency electrical signals applied to the transducer.

15 Claims, 5 Drawing Figures

1

COMBINATION MICROPHONE, SPEAKER, AND CONTROL UNIT FOR A RADIO TRANSCEIVER

BACKGROUND OF THE INVENTION

The present invention generally relates to radio transceivers and, more particularly, to a combination microphone and control unit for a mobile citizens' band transceiver.

Some conventional radio receivers are provided with a microphone and the circuitry necessary to transmit or broadcast a radio signal modulated with audio frequency information (e.g., speech). Such radios are often referred to as "Citizens' Band", "CB", or "two-way" radios or, more generically, "transceivers".

Transceivers are often designed to operate with the electrical system of conventional automobiles and other vehicles, which is typically a 12-volt DC system. Transceivers so designed are often referred to as "mobile transceivers" and they provide substantial convenience to the driver of the vehicle in which they are installed because they enable the driver, while driving, to communicate with a person having a transceiver either at a stationary location or in another vehicle.

Mobile transceivers are not usually provided in new vehicles; that is, they generally are not available as factory-installed accessories, instead, they are added to the vehicle by its owner after he has purchased it. In addition, because of space limitations, mobile transceivers are commonly mounted under the vehicle's dashboard and away from the steering wheel column, where space is a little more plentiful and the transceiver cabinet will not interfere with the driver's operations of steering, braking, accelerating or other control of the car. Such a location permits the driver to hear received radio messages but, for messages he wishes to transmit, a microphone is attached to the transceiver by an electrical cord or cable of suitable length. The driver may thus steer the vehicle with one hand and hold the microphone close to his mouth with the other so that he can transmit messages. A switch is often provided on the housing for the microphone so that the driver may switch between receiving and transmitting.

While the above-described mobile transceivers have been in useful existence for many years, they have some disadvantages. One disadvantage arises from the fact that in addition to the transmission/reception switch, mobile transceivers generally have separate controls for volume, squelch, channel selection and sometimes other functions. Because most of these controls are almost always located on the front of the transceiver cabinet, it can be difficult for the driver to reach and adjust these controls while driving, depending upon where he is able to mount the transceiver. Another disadvantage is that the transceiver cabinet with its associated control knobs sometimes is mounted in the car in a manner which presents a potentially dangerous protruding object which could cause injury during an accident.

It is therefore an object of the present invention to provide a new and improved radio transceiver.

It is another object of the invention to provide such a transceiver which is more convenient to operate.

It is a further object of the invention to provide such a transceiver which is suitable for use by the driver of a moving vehicle yet is safer and more convenient to use than conventional mobile transceivers.

SUMMARY OF THE INVENTION

A combination microphone, loudspeaker, and control unit constructed in accordance with the invention and adapted to be coupled by a multi-conductor cable to a radio transceiver which is capable of transmitting and receiving a plurality of radio signals at preselected frequencies includes a housing for the unit and a multi-conductor cable secured to the housing and adapted to electrically connect the unit to a radio transceiver. A multi-position switch means is mounted in the housing and connected to the cable, with the switch being operable to select individually the preselected frequencies. An electromechanical transducer is mounted in the housing and connected to the cable and operable to convert audible sound wave signals into corresponding audio frequency electrical signals and audio frequency electrical signals into corresponding audible sound wave signals. A transmit/receive switch means is mounted on the housing and coupled to the cable and the transducer for selectively enabling the transducer to convert audible sound wave signals into corresponding audio frequency electrical signals and audio frequency electrical signals into corresponding audible sound wave signals. A volume control means is mounted on the housing and coupled to the cable and the transducer for varying the amplitude of the audio frequency electrical signals applied to the transducer.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 2:
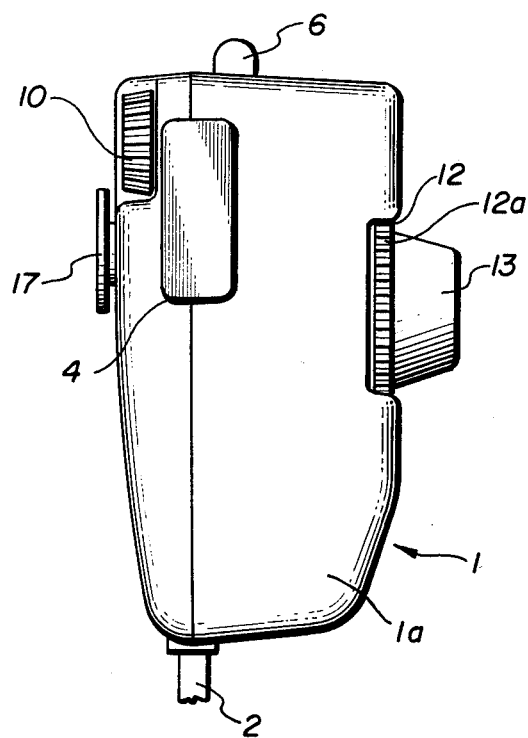
FIG. 2 is a left side elevational view of the embodiment of the invention illustrated in FIG. 1.
Figure 1:
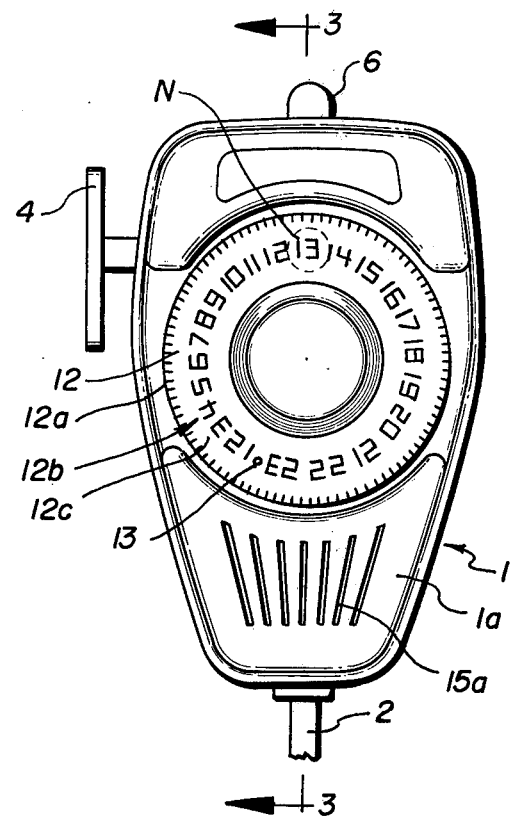
FIG. 1 is a front elevational view of a combination microphone and control unit constructed in accordance with the principles of the present invention.

With reference to FIG. 1, there is shown a combination microphone, speaker, and control until which is constructed in accordance with the principles of the present invention and which is adapted to be coupled to the receiver and transmitter circuitry on the transceiver chassis (see FIG. 5) by means of a partially-shown multi-conductor cord or electrical cable 2. Unit 1 is generally contained within a housing 1a. The particular radio circuitry of the transceiver forms no portion of the present invention and may be of any conventional construction.

Figure 3:
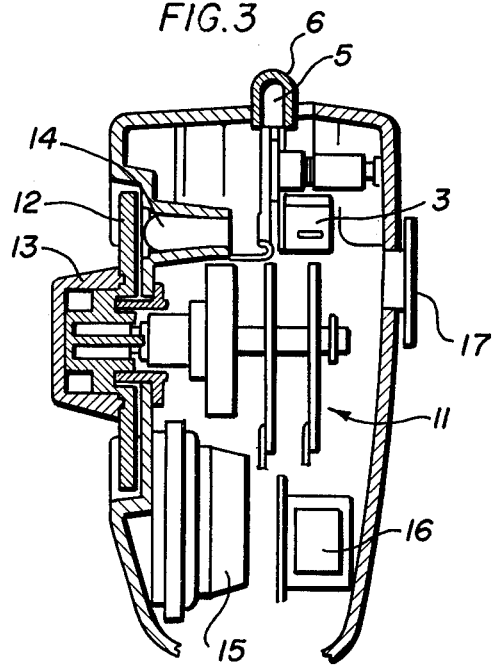
FIG. 3 is a cross-sectional view taken substantially along line 3—3 of FIG. 1.

Behind a grille 15a is mounted an electromechanical transducer in the form of a combination speaker and microphone 15 (see FIG. 3) which is mounted in housing 1a connected to the transceiver circuitry by means of cable 2. Microphone/speaker 15 is operable to convert audible sound wave signals into corresponding audio frequency electrical signals and audio frequency electrical signals into corresponding audible sound wave signals. A transmit/receive control 4 is provided to enable the operator to use microphone/speaker 15 both as a microphone, to convert audible sound wave signals into corresponding audio frequency electrical signals, and a speaker, to convert audio frequency electrical signals into audible sound wave signals, as desired. An impedance-matching transformer 16 is connected to microphone/speaker 15 and is employed to facilitate the dual functions of microphone/speaker 15. Control 4 is mechanically connected to an electrical transmit/receive switch 3 (see FIG. 3) which may be of the spring-loaded push-button or momentary contact type so that, when control 4 is released, switch 3 is urged to the normal or "receive" position and microphone/speaker 15 performs as a speaker to audibly reproduce the message being received by the transceiver. A hanger 17 is provided at the rear of Unit 1 as shown to provide means for supporting the unit when it is not in use.

When control 4 is depressed (i.e., moved to the right in FIG. 1), switch 3 is placed in the "transmit" position and microphone/speaker 15 performs as a microphone to convert the operator's audio message into an electrical signal for transmission by the transceiver to another radio receiver (not shown). Under a lamp cover 6 at the top of unit 1, an indicator lamp 5 (see FIG. 3) is provided and connected to switch 3 so that lamp 5 is illuminated whenever control 4 is in the depressed or "transmit" position. Lamp 5 may also be connected to the transmitter circuitry such that, during transmission, its brightness varies systematically in accordance with the level of modulation.

Figure 4:
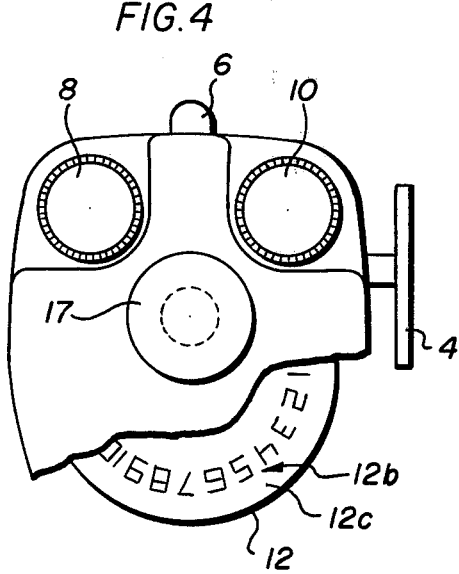
FIG. 4 is a rear elevational view, partially cut away, of the embodiment of the invention illustrated in FIG. 1.

As better shown in FIG. 4, a combination on/off switch and volume control 8 and a squelch control 10 are provided at the rear of unit housing 1a near its top for convenient operation by the operator's thumb and forefinger, respectively. The outer edges of controls 8 and 10 are preferably knurled as shown to facilitate manipulation thereof. Control 8 is coupled to cable 2 and microphone/speaker 15 for varying the amplitude of the audio frequency electrical signals applied to microphone/speaker 15 to control the volume of audible sound wave signals emitted thereby. Squelch control 10 is mounted on housing 1a and is coupled to cable 2 to provide a convenient way of adjusting the signal level at which the transceiver reproduces audible sound wave signals. Squelch control 10 has a variable electrical characteristic such as resistance which may be used for this purpose by the transceiver circuitry as is well known in the radio art.

Returning to FIG. 1, a rotary dial or channel selector knob 13 is attached to a multi-position switch 11 to permit individual selection of the preselected frequencies. A channel indicator board portion or plate 12 carries light transmissive indicia 12b respectively associated with the preselected frequencies, with indicia 12b being surounded by a portion 12c of dial plate 12 which is made substantially the same color as housing 1a so that indicia 12b are substantially invisible except when illuminated as discussed hereinafter in greater detail. The peripheral portion of plate 12 is knurled at 12a and extends substantially to the outer edge of housing 1a to facilitate one-hand operation. In the illustrated embodiment of the invention, indicia for 23 channels are shown because many present-day transceivers are designed to operate on the 23 channels presently assigned by the Federal Communications Commission for Citizens' Band use, the frequencies thereof ranging from 26.96 Mhz to 27.26 Mhz; however, any desired number of channels may be used.

Channel indication is achieved by providing lamp means in the form of a light-emitting diode (LED) 14 mounted on housing 1a adjacent to the indicia-carrying portion of dial plate 12 and coupled to cable 2. When the transceiver is operative, by being turned on by control 8, for example, LED 14 is energized to illuminate one of the indicia on dial plate 12 adjacent to LED 14, as generally indicated at N.

Figure 5:
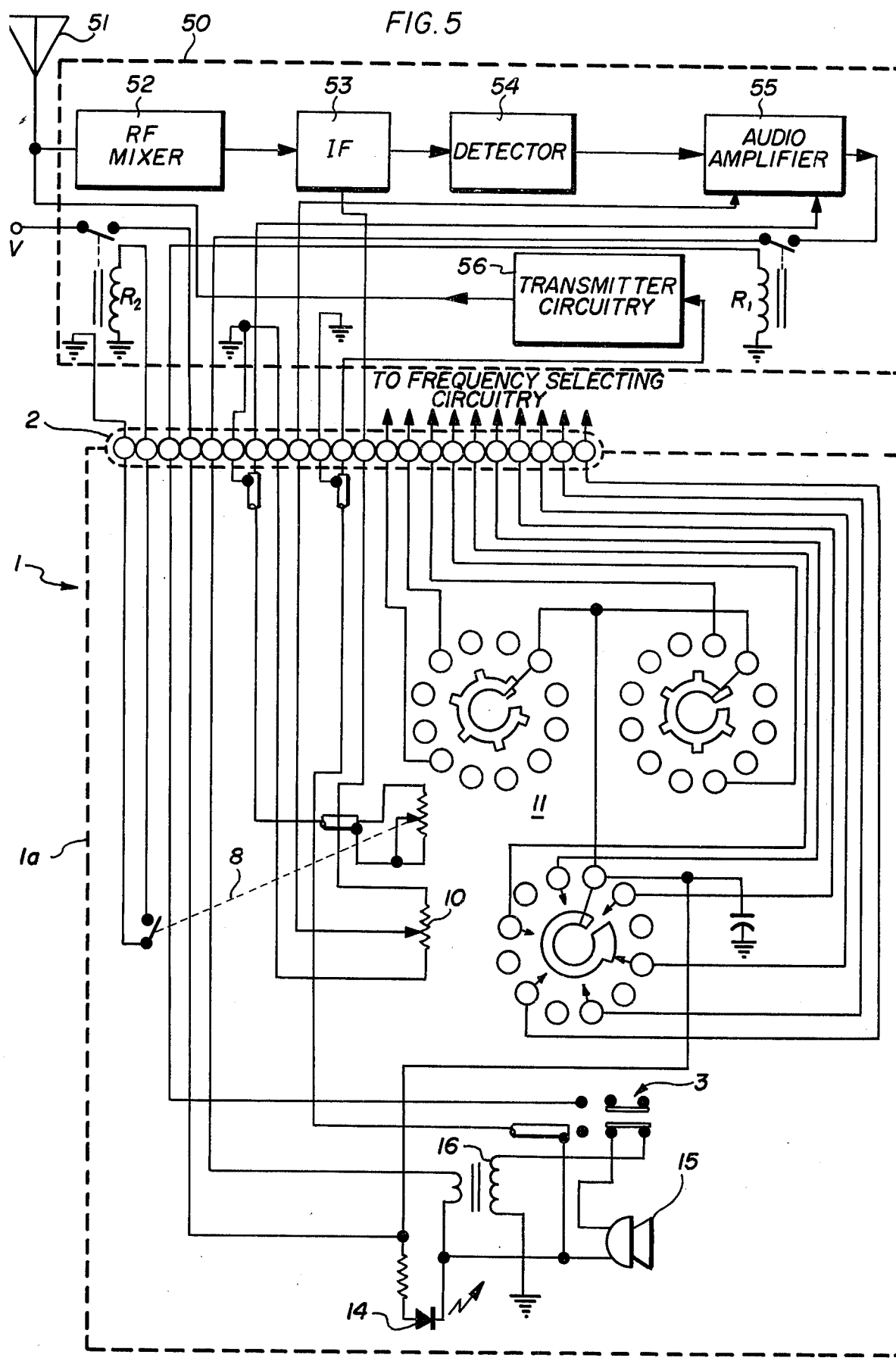
FIG. 5 is a schematic circuit diagram of a mobile transceiver which incorporates a preferred embodiment of the present invention.

With respect to FIG. 5, there is shown a schematic circuit diagram of a mobile transceiver which incorporates a preferred embodiment of the present invention. The embodiment of the invention illustrated in FIG. 5 comprises a radio transceiver including a chassis 50 receiver circuitry mounted on the chassis for receiving a plurality of radio frequency signals at preselected frequencies and converting them into output audio frequency electrical signals. The receiver circuitry includes an antenna 51, "front end" circuitry 52 which includes the appropriate RF amplifiers, local oscillators, and mixer circuits, IF circuitry 53, detector circuitry 54, and audio amplifying circuitry 55. Suitable transmitter circuitry 56 is also mounted on the chassis for converting input audio frequency electrical signals into transmitted radio signals at any one of the preselected frequencies. The output of transmitter circuitry 56 is applied to antenna 51 for transmission to another radio. All of the above-described circuitry may be conventional well-known circuitry and is therefore not described in greater detail.

In accordance with the embodiment of the invention illustrated in FIG. 5, the circuitry for a combination microphone, speaker, and control unit 1 is provided in housing 1a and is connected to the receiver and transmitter circuitry by means of multi-conductor cable 2. Cable 2 may of course be of any desired length and may also have suitable plugs and jacks incorporated therein for permitting the combination unit to be easily connected and disconnected from the radio transceiver chassis 50. Multi-position switch means in the form of a three-wafer switch in the embodiment of the invention illustrated in FIG. 5 is mounted in housing 1a and connected to cable 2 to permit the operator to select individually the preselected frequencies. This embodiment of the invention contemplates a frequency-synthesized system for selecting the 23 frequencies of a citizen's band receiver; hence, switch 11 requires only 10 conductors in cable 2 to connect it with the frequency-selecting circuitry of the transceiver. Various frequency synthesizing techniques are well known in the radio art which may of course be used without departing from the principles of the present invention.

Transmit/receive switch 3, which is operated by control 4 (see FIG. 1), is mounted on housing 1a and is coupled between microphone/speaker 15 and the receiver and transmitter circuitry by cable 2 for enabling microphone/speaker 15 selectively to convert audible sound wave signals into corresponding input audio frequency electrical signals, which are applied to transmitter circuitry 56, and output audio frequency electrical signals, from audio amplifier 55, into corresponding audible sound wave signals. Combination on/off switch and volume control 8 is mounted on housing 1a and coupled between microphone/speaker 15 and audio amplifier 55 for varying the amplitude of the output audio frequency electrical signals applied to microphone/speaker 15 from audio amplifier 55. The power supply V for the transceiver is coupled to the on/off switch portion of control 8 to enable turning the transceiver on and off from the combination unit.

When the transceiver is turned on, an indicator light 14, which is shown in FIG. 5 in the form of a light-emitting diode (LED), is energized to indicate both that the transceiver is turned on, as discussed above, and to indicate to which channel the receiver is tuned. A LED provides sufficient light while requiring a minimum amount of electricity but indicator light 14 may of course take the form of other lights such as conventional incandescent lamps. Relays R1 and R2 may be employed as shown to couple the output of audio amplifier 55 to microphone/speaker 15, when the unit is in the receive mode, and apply power from the automobile's battery, for example, to the unit, respectively. As discussed above, all the lines may be incorporated into one multi-conductor cable 2, with the conductors that carry the audio frequency electrical signals being shielded cable to minimize interference from ambient signals.

With all of the transceiver controls mounted on a hand-held unit in the manner shown in the drawing, the operator can manipulate these controls to make the desired adjustments quite conveniently. This construction also provides greater safety because it eliminates the need for the driver to reach over to the main chassis of the mobile transceiver, which could distract his attention from his driving and/or interfere with his vision. Another advantage of this construction, with respect to both safety and appearance, is that the main chasis of the transceiver can be located out of sight under the dashboard or the like. This eliminates the possibility of the chassis protruding such that, during an accident such as a collision, it could cause injury to an occupant of the vehicle who might be propelled towards it. Mounting the transceiver chassis in a remote location (such as behind the dashboard or in the trunk) not only improves the aesthetic aspects of the installation but also reduces the possibility of theft of the unit because it is both out of sight and may be more permanently secured to the automobile. Although the microphone/control unit of the present invention has been shown and described principally with respect to a mobile transceiver, it is of course understood that the advantages provided by the invention may be used in non-mobile transceivers, sometimes referred to as "base stations".

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. A combination transducer and control unit adapted to be coupled by a multi-conductor cable to a separate radio transceiver chassis which is capable of transmitting and receiving a plurality of radio signals at preselected frequencies, comprising: a housing of a size which is conveniently held by one hand; a multi-conductor cable secured to said housing and adapted to electrically connect said combination unit to said radio transceiver chassis; multi-position switch means mounted in said housing and connected to said cable, said switch means being operable to select individually said preselected frequencies; illuminated channel indicating means mounted on said housing and responsive to said switch means for indicating the frequency to which said transceiver is turned; an electromechanical transducer mounted in said housing and connected to said cable transmit/receive switch means mounted on said housing and coupled to said cable and said transducer for selectively enabling said transceiver to transmit or receive said radio signals; and volume control means mounted on said housing and coupled to said cable and said transducer for varying the amplitude of the audio frequency electrical signals produced by said transceiver; said frequency-selecting switch means, transmit/receive switch means, and volume control means each being located on said housing so as to be operable by the finger of the same hand of the operator which is holding the unit.

2. A combination control unit in accordance with claim 1, which further comprises squelch control means mounted on said housing and coupled to said cable, said squelch control means having a variable electrical characteristic and being operable to apply said characteristic by means of said cable to said radio transceiver to adjust the squelch level of said transceiver, said squelch control means further being located on said housing so as to be conveniently operable by the fingers of the same hand of the operator which is holding the unit.

3. A combination control unit in accordance with claim 1, which further includes a rotary dial attached to said multi-position switch, said dial carrying light transmissive indicia respectively associated with said preselected frequencies, with said indicia being surrounded by a portion of said dial which is substantially the same color as said housing; said combination unit further comprising lamp means mounted on said housing adjacent to the indicia carrying a portion of said dial and coupled to said cable, said lamp means adapted to be energized when said radio transceiver is operative to illuminate one of the indicia on said dial adjacent to said lamp means, whereby said indicia are substantially invisible except when selectively rotated to the position adjacent the lamp to thus indicate the channel to which the transceiver is tuned.

4. A combination control unit in accordance with claim 3, in which said lamp means comprises a light-emitting diode, whereby indication of both the operative condition of the transceiver and the frequency to which the transceiver is tuned may be achieved while conserving electrical energy.

5. A combination control unit in accordance with claim 3, in which said dial has a peripheral portion which is knurled and extends substantially to the outer edge of said housing, whereby one-hand rotation of the dial by the operator while he is holding the unit in his hand is facilitated.

6. A combination control unit in accordance with claim 1, which further comprises an impedance matching transformer, connected between said transducer and said cable, and coupled to said transmit/receive switch means for enhancing the conversion characteristics of said transducer.

7. A combination control unit in accordance with claim 1, in which said volume control means further includes on/off switch means connected to said cable, whereby the operator may use the control unit to turn the transceiver on and off.

8. A control unit in accordance with claim 1, in which said tranducer operates as a microphone and a loudspeaker.

9. A radio transceiver comprising: a chassis; receiver circuitry mounted on said chassis for receiving a plurality of radio frequency signals at preselected frequencies and converting them into output audio frequency electrical signals; transmitter circuitry mounted on said chassis for converting input audio frequency electrical signals into transmitted radio signals at any one of said preselected frequencies; a separate combination transducer and control unit housing of a size which is conveniently held by one hand; a multi-conductor cable secured to said housing and said chassis for electrically connecting said combination unit to said receiver and transmitter circuitry; multi-position switch means mounted in said housing and connected to said cable, said switch means being operable to select individually said preselected frequencies; illuminated channel indicating means mounted on said housing and responsive to said switch means for indicating the frequency to which said transducer is tuned; an electromechanical transducer mounted in said housing and connected to said receiver and transmitting circuitry by said cable and operable to convert said output audio frequency electrical signals into corresponding audible sound wave signals and audible sound wave signals into corresponding input audio frequency electrical signals; transmit/receive switch means mounted on said housing and coupled between said transducer and said receiver and transmitter circuitry by said cable for selectively enabling said transducer to convert audible sound wave signals into said corresponding input audio frequency electrical signals and said output audio frequency electrical signals into corresponding audible sound wave signals; and, volume control means mounted on said housing and coupled between said transducer and said receiver and transmitter circuitry for varying the amplitude of the output audio frequency electrical signals applied to said transducer; said frequency-selecting switch means, transmit/receive switch means, and volume control means each being located on said housing so as to be operable by the finger of the same hand of the operator which is holding the unit.

10. A combination control unit in accordance with claim 9, which further comprises squelch control means mounted on said housing and coupled to said cable, said squelch control means having a variable electrical characteristic and being operable to apply said characteristic by means of said cable to said radio transceiver to adjust the squelch level of said transceiver, said squelch control means further being located on said housing so as to be conveniently operable by the fingers of the same hand of the operator which is holding the unit.

11. A combination control unit in accordance with claim 9, which further includes a rotary dial attached to said multi-position switch, said dial carrying light transmissive indicia respectively associated with said preselected frequencies, with said indicia being surrounded by a portion of said dial which is substantially the same color as said housing; said combination unit further comprising lamp means mounted on said housing adjacent to the indicia carrying a portion of said dial and coupled to said cable, said lamp means adapted to be energized when said radio transceiver is operative to illuminate one of the indicia on said dial adjacent to said lamp means, whereby said indicia are substantially invisible except when selectively rotated to the position adjacent the lamp to thus indicate the channel to which the transceiver is tuned.

12. A combination control unit in accordance with claim 11, in which said lamp means comprises a light-emitting diode, whereby indication of both the operative condition of the transceiver and the frequency to which the transceiver is tuned may be achieved while conserving electrical energy.

13. A combination control unit in accordance with claim 11, in which said dial has a peripheral portion which is knurled and extends substantially to the outer edge of said housing, whereby one-hand rotation of the dial by the operator while he is holding the unit in his hand is facilitated.

14. A combination control unit in accordance with claim 9, which further comprises an impedance matching transformer, connected between said transducer and said cable, and coupled to said transmit/receive switch means for enhancing the conversion characteristics of said transducer.

15. A combination control unit in accordance with claim 9, in which said volume control means further includes on/off switch means connected to said cable, whereby the operator may use the control unit to turn the transceiver on and off.

* * * * *